US012431663B2

(12) United States Patent
Kimura et al.

(10) Patent No.: US 12,431,663 B2

(45) Date of Patent: Sep. 30, 2025

(54) CONNECTOR REMOVAL-RESTRICTING STRUCTURE

(71) Applicant: ISUZU MOTORS LIMITED, Tokyo (JP)

(72) Inventors: Yuho Kimura, Fujisawa (JP); Takuma Mizutani, Fujisawa (JP); Junichi Yokoyama, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 274 days.

(21) Appl. No.: 18/547,041

(22) PCT Filed: Mar. 2, 2022

(86) PCT No.: PCT/JP2022/008719

§ 371 (c)(1),
(2) Date: Aug. 18, 2023

(87) PCT Pub. No.: WO2022/186236

PCT Pub. Date: Sep. 9, 2022

(65) Prior Publication Data

US 2024/0145983 A1 May 2, 2024

(30) Foreign Application Priority Data

Mar. 2, 2021 (JP) ................................ 2021-032970

(51) Int. Cl.
*H01R 13/639* (2006.01)
*H01R 13/52* (2006.01)

(52) U.S. Cl.
CPC ....... *H01R 13/5202* (2013.01); *H01R 13/639* (2013.01); *H01R 2201/26* (2013.01)

(58) Field of Classification Search
None
See application file for complete search history.

(56) References Cited

U.S. PATENT DOCUMENTS 5,618,195 A * 4/1997 Cappe .............. H01R 13/62911 439/157
6,036,509 A 3/2000 Maejima
(Continued)

FOREIGN PATENT DOCUMENTS

JP H05-314958 A 11/1993
JP H09-219246 A 8/1997
(Continued)

OTHER PUBLICATIONS

Patent Cooperation Treaty, International Search Report, Application No. PCT/JP2022/008719, dated May 24, 2022, in 7 pages.
(Continued)

*Primary Examiner* — Tho D Ta
(74) *Attorney, Agent, or Firm* — PROCOPIO, CORY, HARGREAVES & SAVITCH LLP

(57) ABSTRACT

A harness-side connector 2 includes: a connector body 11 connected to a unit-side connector of a hydraulic unit 1; and a slide lock 12 supported by the connector body 11 to be slidable in the upper-lower direction. A sealing clip 3 is attached to the hydraulic unit 1 and the like in the locked state by moving upward while being restricted form movement in a direction intersecting the upper-lower direction. A first claw 29 of the sealing clip 3 is engaged with reinforcing ribs 8 of the hydraulic unit 1, so that the downward movement of the sealing clip 3 with respect to the hydraulic unit 1 and the like is restricted. The contact plate 15 of the sealing clip 3 contacts the slide lock 12 from below, so that the downward movement of the slide lock 12 with respect to the connector body 11 is restricted.

3 Claims, 5 Drawing Sheets

(56) References Cited

U.S. PATENT DOCUMENTS

| | | | | |
|---|---|---|---|---|
| 9,356,390 | B2 * | 5/2016 | Annis ................ | H01R 13/6272 |
| 9,871,328 | B2 * | 1/2018 | Lopes ................ | H01R 13/5213 |
| 2019/0067875 | A1 | 2/2019 | Ohfuku | |

FOREIGN PATENT DOCUMENTS

| | | | |
|---|---|---|---|
| JP | H10-247552 | A | 9/1998 |
| JP | 2008-105643 | A | 5/2008 |
| JP | 2012-015055 | A | 1/2012 |
| JP | 2014-075345 | A | 4/2014 |
| JP | 2018-093671 | A | 6/2018 |
| JP | 2019-046636 | A | 3/2019 |

OTHER PUBLICATIONS

Patent Cooperation Treaty, WOSA, Application No. PCT/JP2022/008719, dated May 24, 2022, in 4 pages.

* cited by examiner

CONNECTOR REMOVAL-RESTRICTING STRUCTURE

TECHNICAL FIELD

The present disclosure relates to a connector removal-restricting structure.

BACKGROUND ART

Patent Literature 1 discloses a brake hydraulic pressure control device. The case of the brake hydraulic pressure control device is fixed to the body of a hydraulic unit. A unit-side connector is formed in a portion extending to the outside of the side wall of the partition wall of the case, and a plurality of terminals connected to an electronic control unit substrate are provided inside the outer peripheral wall of the unit-side connector. A vehicle-side connector provided at one end of a wire harness is coupled to the unit-side connector. An annular groove into which the outer peripheral wall of the unit-side connector is fitted is formed in the vehicle-side connector.

CITATION LIST

Patent Literature

Patent Literature 1: JP2008-105643A

SUMMARY OF INVENTION

Technical Problem

As in the vehicle-side connector described in Patent Literature 1, a connector (external connection connector) connected to a unit-side connector of a mating hydraulic unit (electronic control unit) may be provided with a locking member for maintaining the connected state with the unit-side connector in a manner movable in a first direction. In this case, in a state where the external connection connector is connected to the unit-side connector, when the locking member is moved to one side in the first direction, the movement of the external connection connector in the detachment direction is restricted. When the locking member is moved to the other side in the first direction, the restriction of the movement of the external connection connector in the detachment direction is released, and the external connection connector can be detached from the unit-side connector.

After the external connection connector is connected to the unit-side connector, the detachment of the external connection connector from the unit-side connector may be prohibited in order to prohibit unauthorized access to the substrate of the electronic control unit. According to the locking member, since the locking member can be unlocked by moving to the other side in the first direction so that the external connection connector can be detached from the unit-side connector, it is difficult to prohibit the detachment of the external connection connector from the unit-side connector.

An object of the present disclosure is to provide a connector removal-restricting structure capable of prohibiting detachment of an external connection connector from a unit-side connector.

Solution to Problem

A connector removal-restricting structure according to a first aspect of the present disclosure includes an electronic control unit, an external connection connector, and a sealing member. The electronic control unit includes a unit-side connector. The external connection connector includes an external connector body connected to the unit-side connector and a locking member supported by the external connector body in a manner movable between a locked position closer to the external connector body and an unlocked position on one side in a first direction with respect to the locked position. Regarding the external connection connector, movement in a detachment direction of the external connector body in a connector connected state, in which the external connector body is connected to the unit-side connector, is restricted in a locked state in which the locking member is located at the locked position. Movement in the detachment direction of the external connector body in the connector connected state being allowed in an unlocked state in which the locking member is located at the unlocked position. The sealing member is attached to the external connection connector and the electronic control unit in the locked state by sliding from the one side to the other side in the first direction while being restricted from moving in a direction intersecting the first direction, and, at a sealed position on the other side, restricts movement of the locking member with respect to the external connector body from the locked position toward the unlocked position. At least one of the electronic control unit or the external connector body includes a first engaging portion. The sealing member includes a contact portion configured to, at the sealed position, contact the locking member in the locked position from the one side in the first direction, and a second engaging portion configured to, at the sealed position, be engaged with the first engaging portion to restrict movement of the sealing member toward the one side in the first direction with respect to the electronic control unit and the external connection connector in the locked state.

In the above configuration, the sealing member is attached to the external connection connector and the electronic control unit in the locked state by sliding while being restricted from moving in a direction intersecting the first direction. In a state in which the sealing member is attached to the sealed position with respect to the external connection connector and the electronic control unit in the locked state (hereinafter referred to as "sealed state"), the contact portion of the sealing member contacts the locking member in the locked position from the one side in the first direction, and the second engaging portion is engaged with the first engaging portion. Therefore, the sealing member is restricted from moving along the first direction with respect to the electronic control unit and the external connection connector in the locked state. That is, in the sealed state, the sealing member is restricted from moving along the first direction and from moving in a direction intersecting the first direction, so that the sealing member cannot be detached from the external connection connector and the electronic control unit in the locked state. The external connection connector means a connector that is connected to the electronic control unit from the outside.

At the sealed position, the contact portion of the sealing member contacts the locking member in the locked position from the one side in the first direction, and the second engaging portion is engaged with the first engaging portion to restrict movement of the sealing member toward the one side in the first direction with respect to the electronic control unit and the external connection connector in the locked state.

Accordingly, the sealing member cannot be detached from the external connection connector and the electronic control unit in the locked state, and the locking member cannot be moved from the locked position to the unlocked position. Therefore, the locking member of the external connection connector can be sealed in the locked state by the sealing member, and the detachment of the external connection connector from the unit-side connector can be prohibited.

The detachment of the external connection connector from the unit-side connector can be prohibited by the simple operation of sliding and attaching the sealing member to the external connection connector and the electronic control unit in the locked state. Therefore, for example, unlike a case where sealing is performed by providing wire insertion holes that communicate with each other in the locked state to both the external connector body and the locking member, inserting a sealing wire into the wire insertion holes to form a loop in the locked state, and attaching a sealing lead member or the like to both ends of the sealing wire with a dedicated tool, it is possible to easily seal the locking member of the external connection connector by a simple operation, so that the detachment of the external connection connector from the unit-side connector can be prohibited.

A second aspect of the present disclosure is the connector removal-restricting structure according to the first aspect, in which the sealing member includes an extended portion extending from one end of the contact portion in a second direction intersecting the first direction toward both sides in the first direction, and a rib disposed at a corner between the contact portion and a one-side region of the extended portion on the one side in the first direction with respect to the one end of the contact portion, the rib being provided integrally with both the contact portion and the one-side region of the extended portion. The second engaging portion of the sealing member is provided integrally with an other-side region of the extended portion on the other side in the first direction with respect to the one end of the contact portion. The rib of the sealing member is formed in a plate shape intersecting both the first direction and the second direction. The rib of the sealing member breaks when a load toward the one side in the first direction is input to the contact portion and the contact portion is tilted about the one end in a direction approaching the one-side region of the extended portion.

In the above configuration, the sealing member includes the extended portion extending from the one end of the contact portion in the second direction toward both sides in the first direction, and the second engaging portion of the sealing member is provided integrally with the other-side region of the extended portion on the other side in the first direction with respect to the one end of the contact portion. Therefore, for example, when the contact portion of the sealing member is pulled toward the one side in the first direction to detach the sealing member in the sealed state for unauthorized access to the substrate of the electronic control unit, the contact portion of the sealing member tilts toward the one side in the first direction about the one end, and stress is likely to concentrate at the portion where (the one end of) the contact portion and the extended portion intersect.

Further, the sealing member includes the rib disposed at the corner between the contact portion and the one-side region of the extended portion. The rib is provided integrally with both the contact portion and the one-side region of the extended portion. The rib of the sealing member breaks when a load toward the one side in the first direction is input to the contact portion and the contact portion is tilted about the one end in a direction approaching the one-side region of the extended portion. That is, when the contact portion of the sealing member is pulled toward the one side in the first direction to detach the sealing member in the sealed state for unauthorized access to the substrate of the electronic control unit as described above, the contact portion of the sealing member is tilted in a direction approaching the one-side region of the extended portion about the one end, and the rib of the sealing member is plastically deformed and then breaks. Therefore, after the contact portion of the sealing member in the sealed state is pulled toward the one side in the first direction so that the portion where the contact portion and the extended portion intersect with each other breaks and the sealing member is detached, even if the broken portion is fixed by an adhesive or the like to seal the sealing member again, the plastic deformation of the rib enables recognition from the outside that the sealing member has been detached once. In this way, after the sealing member in the sealed state breaks and is detached, the sealing member cannot be attached again as before, so that the detachment of the sealing member in the sealed state can be prevented, and the detachment of the external connection connector from the unit-side connector can be prohibited.

A third aspect of the present disclosure is the connector removal-restricting structure according to the second aspect, in which the sealing member includes a plate formed in a plate shape intersecting both the first direction and the second direction. The plate is disposed on the other side in the first direction of the contact portion, and is provided integrally with both the contact portion and the other-side region of the extended portion. The plate of the sealing member includes an easily breakable portion extending from an end of the plate on the other side in the first direction toward a corner between the contact portion and the other-side region of the extended portion.

In the above configuration, the sealing member includes the plate disposed on the other side in the first direction of the contact portion and provided integrally with both the contact portion and the other-side region of the extended portion, so that the contact portion and the extended portion can be reinforced by the plate.

Since the plate of the sealing member has the easily breakable portion, the plate can break at the easily breakable portion when the contact portion of the sealing member in the sealed state is pulled toward the one side in the first direction.

The easily breakable portion of the plate of the sealing member extends from the end of the plate on the other side in the first direction toward the corner between the contact portion and the other-side region of the extended portion. Therefore, when the contact portion of the sealing member in the sealed state is pulled toward the one side in the first direction to break the plate at the easily breakable portion, stress can be concentrated at the portion where the contact portion and the extended portion intersect, and the sealing member can easily break at the portion where the contact portion and the extended portion intersect.

Advantageous Effects of Invention

According to the present disclosure, it is possible to prohibit detachment of an external connection connector from a unit-side connector.

DESCRIPTION OF EMBODIMENTS

Figure 7:
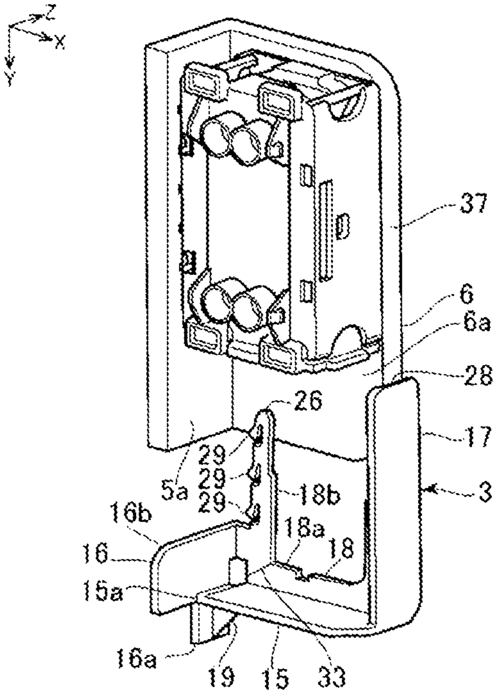
FIG. 7 is a perspective view of the main part of FIG. 1.

Hereinafter, an embodiment of the present disclosure will be described with reference to the drawings. In the following description, the direction along the arrow X in each drawing is referred to as the front-rear direction (second direction), the direction along the arrow Y is referred to as the upper-lower direction (first direction), and the direction along the arrow Z is referred to as the width direction. In FIG. 7, the hydraulic unit 1 is simplified.

Figure 1:
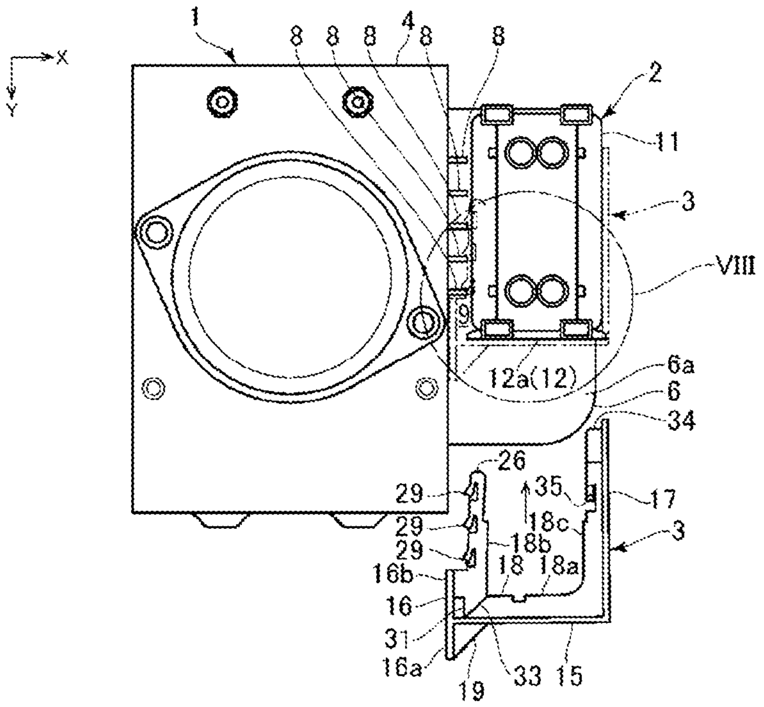
FIG. 1 is a plan view of a connector removal-restricting structure according to an embodiment of the present disclosure.

As illustrated in FIG. 1, the connector removal-restricting structure according to the present embodiment is applied to a structure for prohibiting a harness-side connector (external connection connector) 2 from unauthorized detachment from a hydraulic ABS unit (electronic control unit) 1 (hereinafter referred to as "hydraulic unit 1") for controlling the brake hydraulic pressure of a vehicle after the harness-side connector 2 is connected to the hydraulic unit 1.

The connector removal-restricting structure includes the hydraulic unit 1, the harness-side connector 2, and a sealing clip (sealing member) 3.

Figure 2:
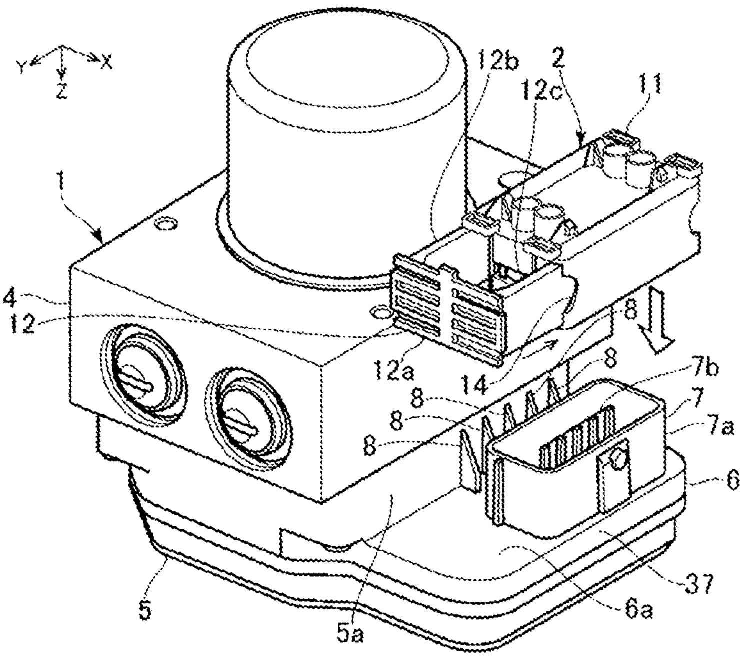
FIG. 2 is a perspective view of a hydraulic unit and a harness-side connector of FIG. 1 before attachment.
Figure 3:
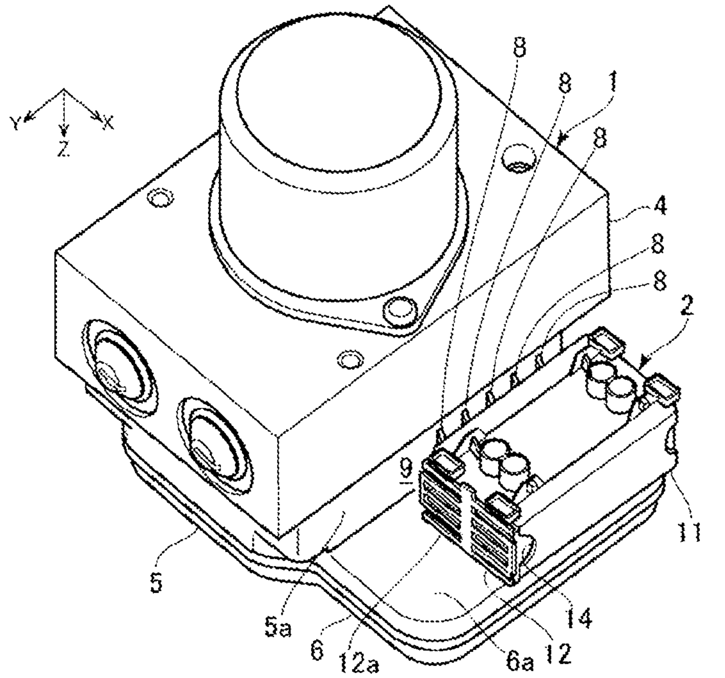
FIG. 3 is a perspective view of the harness-side connector and the hydraulic unit in a connector connected state.

As illustrated in FIGS. 1 to 3, the hydraulic unit 1 is an electronic control unit used in an antilock brake system (ABS) of a vehicle, and controls the brake hydraulic pressure of the vehicle. The hydraulic unit 1 includes a box-shaped body 4 that accommodates a hydraulic pump, a reservoir, a plurality of solenoid valves and the like (hereinafter referred to as "solenoid valves and the like") (not illustrated), and a substrate case 5 that accommodates a substrate (not illustrated) for electronically controlling the solenoid valves and the like of the body 4.

The substrate case 5 is fixed to the surface of the body 4 on one side in the width direction (the side indicated by the arrow Z). The substrate case 5 includes a connector support 6 protruding rearward (in the direction indicated by the arrow X) from the body 4, a unit-side connector 7 protruding toward the other side in the width direction (the side opposite to the direction indicated by the arrow Z) from a connector basic surface 6*a* of the connector support 6 on the other side in the width direction, and a plurality of (five in the present embodiment) reinforcing ribs (first engaging portions) 8 disposed between a rear surface 5*a* of the substrate case 5 and the unit-side connector 7.

The unit-side connector 7 has an outer peripheral wall 7*a* and a terminal 7*b*. The outer peripheral wall 7*a* is formed in a substantially rectangular tube shape that is longer in the upper-lower direction than in the front-rear direction, and protrudes from the connector basic surface 6*a* of the connector support 6 to the other side in the width direction. The terminal 7*b* is disposed inside the outer peripheral wall 7*a* in the radial direction and is connected to the substrate (not illustrated). The rear surface 5*a* of the substrate case 5 is disposed at a position separated forward (opposite to the direction indicated by the arrow X) from the outer peripheral wall 7*a*, and faces the front surface of the outer peripheral wall 7*a*.

The rear surface 5*a* of the substrate case 5 stands from the connector basic surface 6*a* of the connector support 6 toward the other side in the width direction. A gap 9 longer in the upper-lower direction than in the front-rear direction is provided between the rear surface 5*a* of the substrate case 5 and the outer peripheral wall 7*a* of the unit-side connector 7. Regarding this gap 9, both sides in the front-rear direction are partitioned by the rear surface 5*a* of the substrate case 5 and the front surface of the outer peripheral wall 7*a* of the unit-side connector 7, the one side in the width direction is partitioned by the connector basic surface 6*a* of the connector support 6, and the other side in the upper-lower direction and the other side in the width direction are opened.

The plurality of reinforcing ribs 8 are ribs for reinforcing the substrate case 5, are formed in a plate shape intersecting the upper-lower direction, and are disposed in the gap 9 between the rear surface 5*a* of the substrate case 5 and the unit-side connector 7 in a state of being separated from each other in the upper-lower direction. The plurality of reinforcing ribs 8 are formed at corners between the rear surface 5*a* of the substrate case 5 and the connector basic surface 6*a* of the connector support 6, and are provided integrally with both the rear surface 5*a* of the substrate case 5 and the connector basic surface 6*a* of the connector support 6. The rear ends of the plurality of reinforcing ribs 8 are separated forward from the outer peripheral wall 7*a* of the unit-side connector 7.

Figure 4:
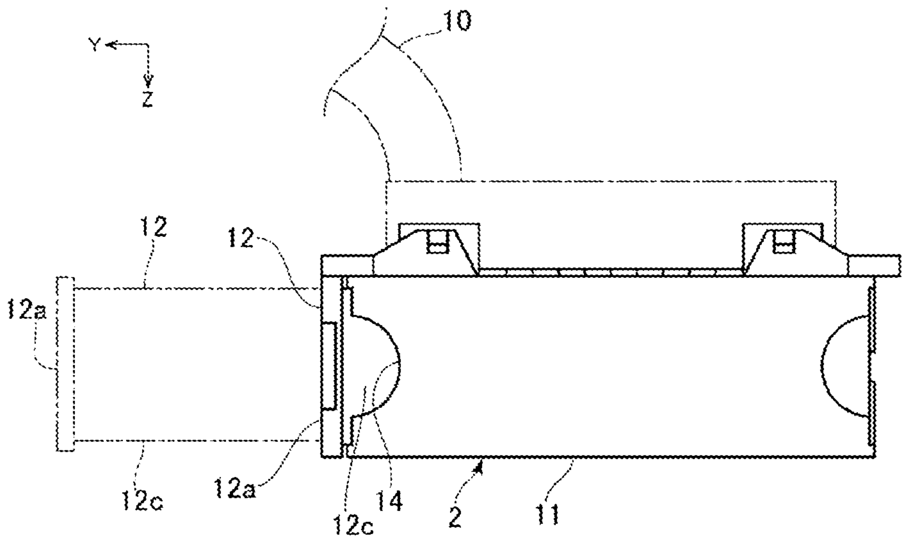
FIG. 4 is a side view of the harness-side connector.
Figure 5:
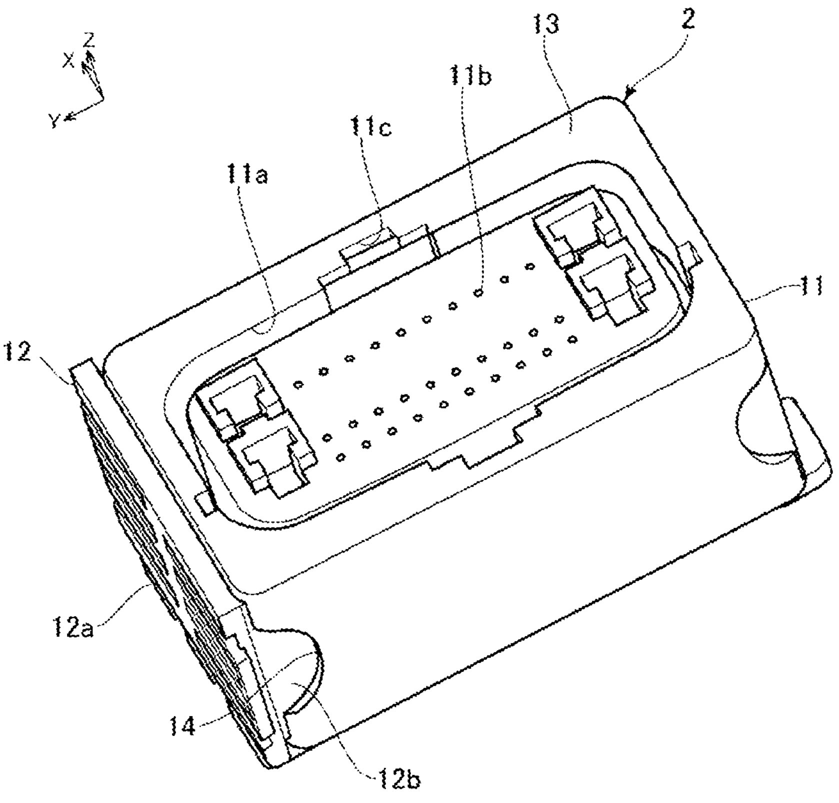
FIG. 5 is a perspective view of the harness-side connector viewed from the back side.
Figure 6:
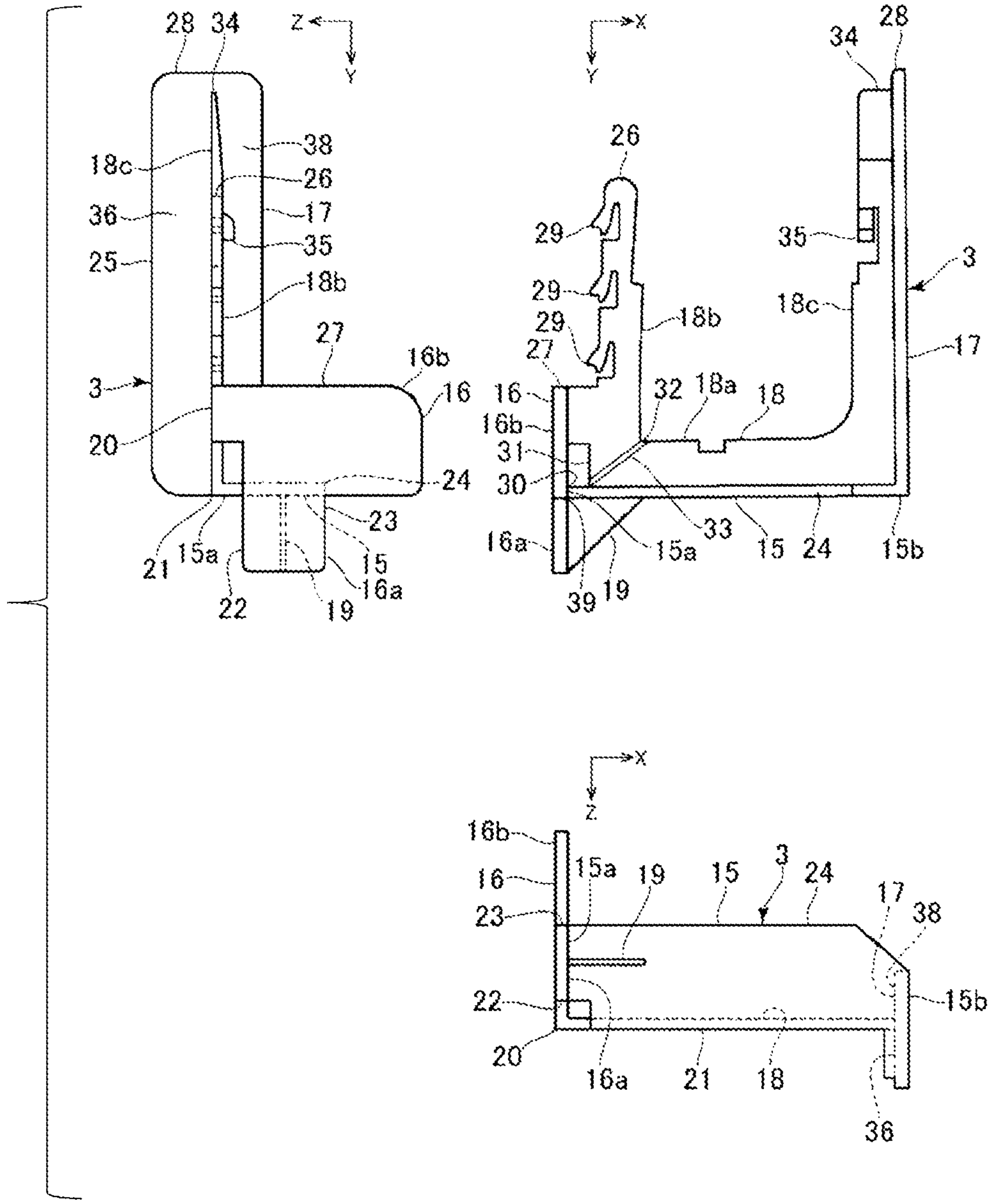
FIG. 6 is a three-sided view of a sealing clip.

As illustrated in FIGS. 1 to 5, the harness-side connector 2 is a connector connected to the unit-side connector 7 of the hydraulic unit 1, and is attached to one end of a wire harness 10 (illustrated by the one-dot dash line in FIG. 4). One end of the wire harness 10 is connected to the other surface of the harness-side connector 2 in the width direction (see FIG. 4).

By connecting the harness-side connector 2 to the unit-side connector 7 of the hydraulic unit 1, signals from various sensors (not illustrated) can be input to the hydraulic unit 1, and the hydraulic unit 1 controls the solenoid valves and the like based on the signals from the various sensors to control the brake hydraulic pressure of the vehicle. The harness-side connector 2 includes: a connector body (external connector body) 11 connected to the unit-side connector 7; and a slide lock (locking member) 12 supported by the connector body 11 in a manner slidable in the upper-lower direction (first direction).

The connector body 11 of the harness-side connector 2 includes an annular groove 11*a* into which the outer peripheral wall 7*a* of the unit-side connector 7 can be inserted, a terminal insertion portion 11*b* into which the terminal 7*b* of the unit-side connector 7 can be inserted, and an engaging recess 11*c* into which the sealing clip 3 can be engaged. The annular groove 11*a* is a groove provided in an annular shape recessed from a surface 13 on one side in the width direction of the connector body 11 to the other side in the width direction, and allows insertion of the outer peripheral wall 7*a* of the unit-side connector 7.

The terminal insertion portion 11*b* is disposed in a region on the inner side in the radial direction of the annular groove 11*a* in the surface 13 on the one side in the width direction of the connector body 11. A terminal on the side closer to the wire harness 10 (not illustrated) is disposed inside the terminal insertion portion 11*b*.

The engaging recess 11*c* is provided on the rear side of the connector body 11, and is formed in a shape cutout rearward from the annular groove 11*a*. The engaging recess 11*c* is recessed toward the other side in the width direction from the surface 13 on the one side in the width direction of the connector body 11. To bring the harness-side connector 2 into the connector connected state of being connected to the unit-side connector 7, the harness-side connector 2 is moved relative to the unit-side connector 7 from the other side in the width direction toward the one side in the width direction (the direction indicated by the white arrow in FIG. 2), so that the outer peripheral wall 7*a* of the unit-side connector 7 is inserted into the annular groove 11*a* of the connector body 11, and the terminal 7*b* of the unit-side connector 7 is inserted into the terminal insertion portion 11*b* of the connector body 11.

In the connector connected state, the terminal 7*b* of the unit-side connector 7 and the terminal on the side closer to the wire harness 10 (not illustrated) are connected to each other inside the terminal insertion portion 11*b* of the connector body 11 of the harness-side connector 2. Both the front and rear sides of the connector body 11 are provided with hole-shaped slide lock supports 14 extending in the upper-lower direction.

The slide lock 12 of the harness-side connector 2 is a member for locking the connector body 11 of the harness-side connector 2 in the connector connected state to the unit-side connector 7, thereby restricting movement of the connector body 11 in the detachment direction (the other side in the width direction) with respect to the unit-side connector 7. The slide lock 12 is formed in a substantially U shape having a locking lower plate 12*a*, a locking front plate 12*b*, and a locking rear plate 12*c*. The locking lower plate 12*a* is a plate intersecting the upper-lower direction and is formed in a substantially rectangular shape longer in the front-rear direction than in the width direction.

The locking front plate 12*b* and the locking rear plate 12*c* are plates intersecting the front-rear direction, and extend upward (in a direction opposite to the direction indicated by the arrow Y) from both the front and rear ends of the locking lower plate 12*a*. The locking front plate 12*b* and the locking rear plate 12*c* are inserted into the front and rear slide lock supports 14 of the connector body 11 from below (in the direction indicated by the arrow Y), and are supported by the connector body 11 in a manner slidable in the upper-lower direction.

The slide lock 12 is slidable between a locked position (indicated by the solid line in FIG. 4) where the locking lower plate 12*a* is brought into contact with the lower surface of the connector body 11 and an unlocked position (indicated by the two-dot dash line in FIG. 4) below the locked position (one side in the first direction).

To bring the harness-side connector 2 into the connector connected state, in the unlocked state (see FIG. 2) in which the slide lock 12 is in the unlocked position, the harness-side connector 2 is moved from the other side in the width direction toward the one side in the width direction (the direction indicated by the white arrow in FIG. 2) with respect to the unit-side connector 7. After being brought into the connector connected state, by sliding the slide lock 12 from the unlocked position to the locked position, the slide lock 12 is engaged with the unit-side connector 7 (not illustrated), and is brought into the locked state in which the movement of the connector body 11 of the harness-side connector 2 with respect to the unit-side connector 7 in the detachment direction (the other side in the width direction) is restricted (see FIG. 3).

On the other hand, when the slide lock 12 in the locked state is slid from the locked position to the unlocked position, the connector body 11 of the harness-side connector 2 and the unit-side connector 7 are unlocked, and the connector body 11 is allowed to move in the detachment direction with respect to the unit-side connector 7.

As illustrated in FIGS. 1 and 3, the rear end side of the harness-side connector 2 in the locked state protrudes rearward from the connector support 6 of the hydraulic unit 1. A gap (not illustrated) is provided between the connector basic surface 6*a* of the connector support 6 of the hydraulic unit 1 and the surface on the one side in the width direction (the side indicated by the arrow Z) of the harness-side connector 2 in the locked state. That is, the harness-side connector 2 in the locked state is separated from the connector basic surface 6*a* of the connector support 6 of the hydraulic unit 1 toward the other side in the width direction.

The front surface of the harness-side connector 2 in the locked state is positioned slightly behind the plurality of reinforcing ribs 8 of the hydraulic unit 1 and faces the rear surface 5*a* of the substrate case 5 from behind. In the locked state, the lowermost one of the reinforcing ribs 8 is located above the lower surface of the locking lower plate 12*a* of the slide lock 12 of the harness-side connector 2.

As illustrated in FIGS. 1 and 6 to 8, the sealing clip 3 is a resin member for prohibiting the detachment of the harness-side connector 2 from the hydraulic unit 1, and is attached to the hydraulic unit 1 and the harness-side connector 2 in the locked state (hereinafter, referred to as "the hydraulic unit 1 and the like in the locked state"). The sealing clip 3 integrally includes a plate-shaped contact plate (contact portion) 15 intersecting the upper-lower direction, a plate-shaped front plate (extended portion) 16 intersecting the front-rear direction, a plate-shaped rear plate 17 intersecting the front-rear direction, a plate-shaped intermediate plate (plate) 18 intersecting the width direction, and a thin plate rib (rib) 19 capable of detecting the breakage of the sealing clip 3.

The contact plate 15 of the sealing clip 3 is formed to be longer in the front-rear direction than in the width direction. The length of the contact plate 15 in the front-rear direction is longer than the length of the harness-side connector 2 in the front-rear direction. In the present embodiment, the length of the contact plate 15 in the front-rear direction is set to a length such that the front plate 16 contacts the rear surface 5*a* of the substrate case 5 of the hydraulic unit 1 and the rear plate 17 contacts the rear surface of the harness-side connector 2 as described later in the sealed state in which the sealing clip 3 is attached to the hydraulic unit 1 and the like in the locked state.

The front plate 16 of the sealing clip 3 linearly extends from a front end (one end) 15*a* of the contact plate 15 to both sides in the upper-lower direction. The front plate 16 extends in a direction orthogonal to the contact plate 15. The front plate 16 has a lower region (one-side region) 16*a* below (on one side in the first direction of) the front end 15*a* of the contact plate 15, and an upper region (other-side region) 16*b* above (on the other side in the first direction of) the front end 15*a* of the contact plate 15.

The length in the upper-lower direction of the upper region 16*b* of the front plate 16 is shorter than the distance from the lower surface of the locking lower plate 12*a* of the slide lock 12 of the harness-side connector 2 in the locked state to the lowermost reinforcing ribs 8 of the hydraulic unit 1. An end 20 on the one side in the width direction of the upper region 16*b* of the front plate 16 is disposed at substantially the same widthwise position (position in the width direction) as an end 21 on the one side in the width direction of the contact plate 15.

The length in the width direction of the upper region 16*b* of the front plate 16 is set smaller than the length in the width direction of the contact plate 15. An end 22 on the one side in the width direction of the lower region 16*a* of the front plate 16 is disposed on the other side in the width direction of the end 21 on the one side in the width direction of the contact plate 15. An end 23 on the other side in the width direction of the lower region 16*a* of the front plate 16 is disposed at substantially the same widthwise position as an end 24 on the other side in the width direction of the contact plate 15.

The rear plate 17 of the sealing clip 3 linearly extends upward from the rear end 15*b* of the contact plate 15. The rear plate 17 extends in a direction orthogonal to the contact plate 15. The length of the rear plate 17 in the upper-lower direction is set to a length from the lower end to the vicinity below the upper end of the harness-side connector 2 (above the center of the harness-side connector 2 in the upper-lower direction). An end 25 on the one side in the width direction of the rear plate 17 is disposed on the one side in the width direction of the end 21 on the one side in the width direction of the contact plate 15. That is, the one side in the width direction of the rear plate 17 protrudes to the one side in the width direction from the contact plate 15.

The intermediate plate 18 of the sealing clip 3 is formed in a plate shape orthogonal to the contact plate 15, the front plate 16, and the rear plate 17. The intermediate plate 18 is formed in a substantially U-shape open upward when viewed in the width direction. The plate thickness of the intermediate plate 18 is smaller than the distance between the connector basic surface 6*a* of the connector support 6 of the hydraulic unit 1 and the surface on the one side in the width direction of the harness-side connector 2 in the locked state.

The intermediate plate 18 includes a first region 18*a* extending in the front-rear direction, a second region 18*b* extending upward from the front end of the first region 18*a*, and a third region 18*c* extending upward from the rear end of the first region 18*a*. The intermediate plate 18 is located above the contact plate 15, and is provided integrally with the contact plate 15, the upper region 16*b* of the front plate 16, and the rear plate 17.

The front-rear distance between the second region 18*b* and the third region 18*c* of the intermediate plate part 18 is set larger than the length in the front-rear direction of the cylindrical outer peripheral wall 7*a* of the unit-side connector 7 of the hydraulic unit 1. The first region 18*a* of the intermediate plate 18 stands upward from the end 21 on the one side of the contact plate in the width direction, and extends in the front-rear direction along the end 21 on the one side of the contact plate 15 in the width direction. The length in the upper-lower direction of the first region 18*a* of the intermediate plate 18 is smaller than the length in the upper-lower direction of the upper region 16*b* of the front plate 16. The front end of the second region 18*b* of the intermediate plate 18 is continuous with the rear surface of the upper region 16*b* of the front plate 16. That is, the second region 18*b* of the intermediate plate 18 is provided integrally with the upper region 16*b* of the front plate 16.

The second region 18*b* of the intermediate plate 18 extends above the upper region 16*b* of the front plate 16. The upper end 26 of the second region 18*b* of the intermediate plate 18 is located above the upper end 27 of the front plate 16 and below the upper end 28 of the rear plate 17. The front end edge of the second region 18*b* of the intermediate plate 18 is formed with a plurality of (three in the present embodiment) first claws (second engaging portions) 29 extending forward and downward. That is, the plurality of first claws 29 are provided integrally with the upper region 16*b* of the front plate 16 via the second region 18*b* of the intermediate plate 18.

The plurality of first claws 29 are formed in a shape that can be engaged with the three lower ones among the plurality of reinforcing ribs 8 of the hydraulic unit 1. Further, the plurality of first claws 29 are formed in a shape capable of restricting the downward movement of the sealing clip 3 with respect to the hydraulic unit 1 and the like in the locked state in a state of being engaged with the reinforcing ribs 8.

The third region 18*c* of the intermediate plate 18 extends in the upper-lower direction along the front surface of the rear plate 17. The rear end of the third region 18*c* of the intermediate plate 18 is continuous with the front surface of the rear plate 17. The upper end 34 of the third region 18*c* of the intermediate plate 18 is positioned slightly below the upper end 28 of the rear plate 17. The third region 18*c* of the intermediate plate 18 is provided with a second claw 35 extending downward on the other side in the width direction.

The second claw 35 can be engaged with the engaging recess 11*c* of the connector body 11 of the harness-side connector 2. Further, the second claw 35 is formed in a shape capable of restricting the downward movement of the sealing clip 3 with respect to the hydraulic unit 1 and the like in the locked state in a state of being engaged with the engaging recess 11*c* of the connector body 11.

A corner 30 between the upper region 16*b* of the front plate 16 and the contact plate 15 in the intermediate plate 18 of the sealing clip 3 (the corner on the outer side between the first region 18*a* and the second region 18*b*) is provided with a corner opening 31 penetrating the intermediate plate 18 in the width direction. The intermediate plate 18 has an easily breakable portion 33 extending linearly from a corner 32 on the inner side between the first region 18*a* and the second region 18*b* toward the corner opening 31 of the intermediate plate 18. That is, the easily breakable portion 33 of the intermediate plate 18 extends from the end on the upper side (the other side in the first direction) of the first region 18*a* of the intermediate plate 18 toward the corner 30 between the contact plate 15 and the upper region 16*b* of the front plate 16. The plate thickness of the easily breakable portion 33 of the intermediate plate 18 is formed smaller than the plate thickness of the other region of the intermediate plate 18 (the region other than the easily breakable portion 33), and is more easily breakable than the other region of the intermediate plate 18.

The thin plate rib 19 of the sealing clip 3 is formed thinner than the contact plate 15, the front plate 16, the rear plate 17, and the intermediate plate 18. The thin plate rib 19 is formed in a substantially right triangular shape when viewed in the width direction. The thin plate rib 19 is disposed at a corner 39 between the contact plate 15 and the lower region 16*a* of the front plate 16, and is provided integrally with the contact plate 15 and the lower region 16*a* of the front plate 16.

The sides of the thin plate rib 19 forming the right angle extend along the lower surface of the contact plate 15 and the rear surface of the lower region 16*a* of the front plate 16. The oblique side of the thin plate rib 19 extends rearward and upward from the lower end of the lower region 16*a* of the front plate 16. When a predetermined load is input to the contact plate 15 in a direction in which the rear end of the contact plate 15 is tilted downward (in a direction approaching the lower region 16*a* of the front plate 16) about the front end 15*a* of the contact plate 15, the thin plate rib 19 yields and deforms elastically, and breaks when a load is further input.

Next, the attachment of the sealing clip 3 will be described. To attach the sealing clip 3 to the hydraulic unit 1 and the like in the locked state, as illustrated in FIGS. 1 and 7, the sealing clip 3 is moved upward from below the locking lower plate 12*a* of the slide lock 12 of the harness-side connector 2.

To move the sealing clip 3 upward, the sealing clip 3 is slid upward in a state where the front plate 16 of the sealing clip 3 is brought into contact with the rear surface 5*a* of the substrate case 5 of the hydraulic unit 1, a region 36 of the rear plate 17 of the sealing clip 3 on the one side in the width direction of the intermediate plate 18 is brought into contact with the rear surface 37 of the connector support 6 of the hydraulic unit 1, and the intermediate plate 18 of the sealing clip 3 is brought into contact with the connector basic surface 6*a* of the connector support 6.

Then, the upper end 34 of the third region 18*c* of the intermediate plate 18 of the sealing clip 3 is inserted into the gap (not illustrated) between the connector basic surface 6*a* of the connector support 6 and the surface on the one side in the width direction of the rear end of the harness-side connector 2, and the upper end 26 of the second region 18*b* of the intermediate plate 18 of the sealing clip 3 is inserted into the gap (not illustrated) between the connector basic surface 6*a* of the connector support 6 and the surface on the one side in the width direction of the front end of the harness-side connector 2.

When the upper end 34 of the third region 18*c* of the intermediate plate 18 of the sealing clip 3 is inserted into the gap (not illustrated) between the connector basic surface 6*a* of the connector support 6 and the surface on the one side in the width direction of the rear end of the harness-side connector 2, a region 38 on the other side in the width direction with respect to the intermediate plate 18 of the rear plate 17 of the sealing clip 3 approaches or comes into contact with the rear surface of the harness-side connector 2.

In a tip end engaged state in which the upper ends 26 and 34 of the intermediate plate 18 of the sealing clip 3 are inserted into the one side in the width direction of the harness-side connector 2 in this way, the movement of the sealing clip 3 toward the one side in the width direction is restricted by the contact between the intermediate plate 18 of the sealing clip 3 and the connector basic surface 6*a* of the connector support 6, and the movement of the sealing clip 3 toward the other side in the width direction is restricted by the contact between the intermediate plate 18 of the sealing clip 3 and the harness-side connector 2.

Since the unit-side connector 7 is disposed between the second region 18*b* and the third region 18*c* of the intermediate plate 18 of the sealing clip 3, the movement of the sealing clip 3 in the front-rear direction is restricted by the contact with the unit-side connector 7.

In the tip end engaged state, the forward movement of the sealing clip 3 is restricted by the contact between the front plate 16 of the sealing clip 3 and the rear surface 5*a* of the substrate case 5 of the hydraulic unit 1, or restricted by the contact between the region 36 of the rear plate 17 of the sealing clip 3 on the one side in the width direction with respect to the intermediate plate 18 and the rear surface 37 of the connector support 6 of the hydraulic unit 1, or restricted by the contact between the region 38 of the rear plate 17 of the sealing clip 3 on the other side in the width direction with respect to the intermediate plate 18 and the rear surface of the harness-side connector 2. That is, the movement of the sealing clip 3 further upward from the tip end engaged state is a sliding movement in a state of being restricted from moving in a direction intersecting the upper-lower direction (the front-rear direction and the width direction).

When the sealing clip 3 is slid further upward from the tip end engaged state, the second region 18*b* of the intermediate plate 18 is inserted between the reinforcing rib 8 of the hydraulic unit 1 and the outer peripheral wall 7*a* of the unit-side connector 7, which are on the front and rear of each other. The plurality of first claws 29 of the intermediate plate 18 are engaged with predetermined reinforcing ribs 8 of the hydraulic unit 1. The second claw 35 of the intermediate plate 18 is engaged with the engaging recess 11*c* of the connector body 11 of the harness-side connector 2. The first region 18*a* of the intermediate plate 18 is inserted into the gap (not illustrated) between the connector basic surface 6*a* of the connector support 6 and the surface on the one side in the width direction of the lower end of the harness-side connector 2. The contact plate 15 contacts the locking lower plate 12*a* of the slide lock 12 of the harness-side connector 2 from below. This achieves the sealed state in which the sealing clip 3 is attached to the hydraulic unit 1 and the like in the locked state (see FIG. 8).

Figure 8:
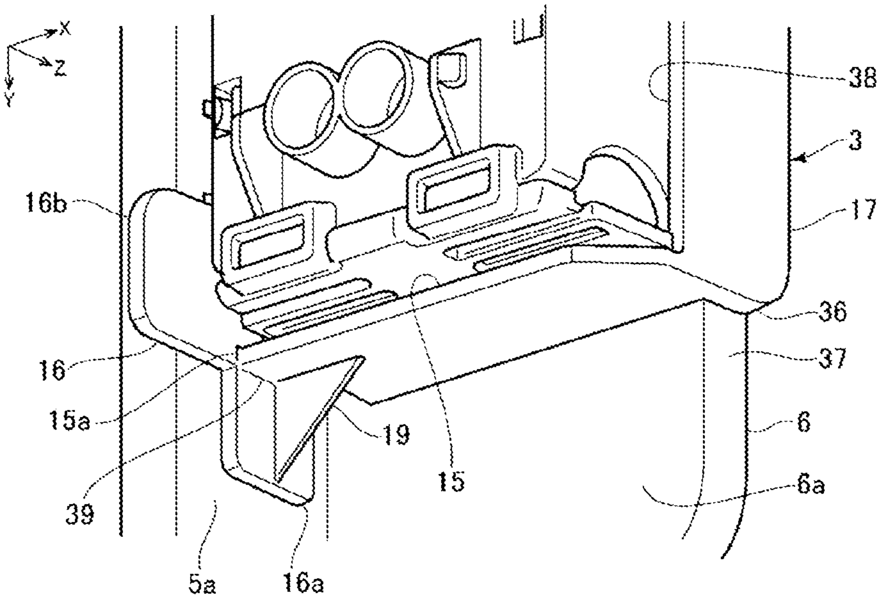
FIG. 8 is a perspective view of a portion VIII in FIG. 1 in a state in which the sealing clip is attached.

As illustrated by the two-dot dash line in FIG. 1 and FIG. 8, in the sealed state, the intermediate plate 18 (the first region 18*a*, the second region 18*b*, and the third region 18*c*) of the sealing clip 3 is inserted into the gap (not illustrated) between the connector basic surface 6*a* of the connector support 6 and the surface on the one side in the width direction of the harness-side connector 2. This restricts the movement of the sealing clip 3 in the width direction with respect to the hydraulic unit 1 and the like in the locked state.

In the sealed state, the movement of the sealing clip 3 in the front-rear direction with respect to the hydraulic unit 1 and the like in the locked state is restricted as in the above-described tip end engaged state. In the sealed state, the second region 18*b* of the intermediate plate 18 of the sealing clip 3 is inserted between the reinforcing ribs 8 of the hydraulic unit 1 and the outer peripheral wall 7*a* of the unit-side connector 7 in the front-rear direction. This restricts the movement of the sealing clip 3 in the front-rear direction with respect to the hydraulic unit 1 and the like in the locked state.

In the sealed state, the plurality of first claws 29 of the sealing clip 3 are engaged with the predetermined reinforcing ribs 8 of the hydraulic unit 1, and the second claws 35 are engaged with the engaging recesses 11*c* of the connector body 11 of the harness-side connector 2. Therefore, the sealing clip 3 with respect to the hydraulic unit 1 and the like in the locked state is restricted from moving downward.

In the sealed state, the contact plate 15 of the sealing clip 3 contacts the locking lower plate 12*a* of the slide lock 12 from below. This restricts the upward movement of the sealing clip 3 with respect to the hydraulic unit 1 and the like in the locked state. That is, in the sealed state, the sealing clip 3 is restricted from moving in the width direction, the front-rear direction, and the upper-lower direction with respect to the hydraulic unit 1 and the like in the locked state. This prevents the breakage from the hydraulic unit 1 and the like in the locked state and thus disables the detachment.

In the sealed state, the contact plate 15 of the sealing clip 3 contacts the locking lower plate 12*a* of the slide lock 12 from below. This restricts the downward movement of the slide lock 12 of the harness-side connector 2 (toward the unlocked position) with respect to the connector body 11.

Next, a case where the sealing clip 3 in the sealed state breaks and is detached from the hydraulic unit 1 or the like will be described. For example, the sealing clip 3 in the sealed state needs to break when the connector connected state is to be released for unauthorized access to the substrate of the hydraulic unit 1 after being sealed.

To break the sealing clip 3 in the sealed state, it is assumed to pull the rear end of the contact plate 15 downward in a state where the upper end of the rear plate 17 of the sealing clip 3 is tilted to the one side in the width direction to release the engagement of the second claw 35 of the intermediate plate 18 and the engaging recess 11*c* closer to the harness-side connector 2.

The front plate 16 is provided closer to the front end 15*a* of the contact plate 15, and the plurality of first claws 29 engaged with the reinforcing ribs 8 of the hydraulic unit 1 are provided integrally with the side closer to the upper region 16*b* of the front plate 16. Therefore, the front end 15*a* of the contact plate 15 does not slide downward even if the rear end side of the contact plate 15 of the sealing clip 3 is pulled downward. Therefore, when the rear end of the contact plate 15 is pulled downward to detach the sealing clip 3, the rear end of the contact plate 15 is tilted downward about the front end 15*a* of the contact plate 15 of the sealing clip 3. The stress is concentrated at the portion where (the front end 15*a* of) the contact plate 15 and the front plate 16 cross each other, which is likely to break.

When the portion where the contact plate 15 and the front plate 16 intersect breaks, the contact plate 15 is tilted in a direction approaching the lower region 16*a* of the front plate 16, thereby breaking the thin plate rib 19 between the contact plate 15 and the lower region 16*a* of the front plate 16. Accordingly, the contact plate 15 of the sealing clip 3 can be detached from the hydraulic unit 1 or the like. Therefore, the slide lock 12 can be moved to the unlocked position to detach the harness-side connector 2 from the unit-side connector 7.

According to the connector removal-restricting structure configured as described above, in the sealed state, the sealing clip 3 cannot be detached from the hydraulic unit 1 and the like (the hydraulic unit 1 and the harness-side connector 2) without breaking, and the slide lock 12 cannot be moved from the locked position to the unlocked position. Therefore, the slide lock 12 of the harness-side connector 2 can be sealed in the locked state by the sealing clip 3. Therefore, according to the present embodiment, it is possible to prohibit detachment of the harness-side connector 2 from the unit-side connector 7.

The second region 18*b* of the intermediate plate 18 of the sealing clip 3 is provided with the first claw 29, and the third region 18*c* of the intermediate plate 18 is provided with the second claw 35. The first claw 29 and the second claw 35 of the sealing clip 3 are arranged on both the front and rear sides of the unit-side connector 7 and the harness-side connector 2 in the sealed state, and are engaged with the reinforcing ribs (first engaging portions) 8 and the engaging recess 11*c* of the hydraulic unit 1 and the like (the hydraulic unit 1 and the harness-side connector 2). Therefore, unlike the case where only the first claw 29 of the sealing clip 3 is engaged with the hydraulic unit 1 and the like in the locked state, the downward movement of the sealing clip 3 with respect to the hydraulic unit 1 and the like in the locked state can be restricted strongly.

The detachment of the harness-side connector 2 from the unit-side connector 7 can be prohibited by the simple operation of sliding and attaching the sealing clip 3 to the hydraulic unit 1 and the like in the locked state. Therefore, for example, unlike a case where sealing is performed by providing wire insertion holes that communicate with each other in the locked state to both the connector body 11 and the slide lock 12 of the harness-side connector 2, inserting a sealing wire into the wire insertion holes to form a loop in the locked state, and attaching a sealing lead member or the like to both ends of the sealing wire with a dedicated tool, it is possible to easily seal the slide lock 12 of the harness-side connector 2 in the locked state by a simple operation, so that the detachment of the harness-side connector 2 from the unit-side connector 7 can be prohibited.

The thin plate rib 19 of the sealing clip 3 is disposed at the corner 39 between the contact plate 15 and the lower region 16*a* of the front plate 16, and is provided integrally with the contact plate 15 and the lower region 16*a* of the front plate 16.

When the contact plate 15 is tilted downward as described above to break and detach the sealing clip 3 in the sealed state, the contact plate 15 is tilted in a direction approaching the lower region 16*a* of the front plate 16. When a predetermined load is input, the thin plate rib 19 yields and plastically deforms, and breaks when a load is further input. Therefore, after the contact plate 15 of the sealing clip 3 in the sealed state is pulled downward so that the portion where the contact plate 15 and the front plate 16 intersect with each other breaks and the sealing clip 3 is detached, even if then the broken portion is fixed with an adhesive or the like to seal the sealing clip 3 again, the plastic deformation of the thin plate ribs 19 enables recognition from the outside that the sealing clip 3 has been detached once.

In this way, after the sealing clip 3 in the sealed state breaks and is detached, the sealing clip 3 cannot be attached again as before, so that unauthorized detachment of the sealing clip 3 in the sealed state can be prevented, and the detachment of the harness-side connector 2 from the unit-side connector 7 can be prohibited.

The intermediate plate 18 of the sealing clip 3 is provided with the easily breakable portion 33. The easily breakable portion 33 is more easily breakable than the other regions of the intermediate plate 18 (the regions other than the easily breakable portion 33). Therefore, when the contact plate 15 of the sealing clip 3 is pulled downward, the intermediate plate 18 can break at the easily breakable portion 33.

The easily breakable portion 33 of the intermediate plate 18 of the sealing clip 3 extends from the end on the upper side of the first region 18*a* of the intermediate plate 18 toward the corner 30 between the contact plate 15 and the upper region 16*b* of the front plate 16. Therefore, when the contact plate 15 of the sealing clip 3 in the sealed state is tilted downward, the intermediate plate 18 can break toward the corner 30 between the contact plate 15 and the upper region 16*b* of the front plate 16. Therefore, the stress can be concentrated at the portion where the contact plate 15 and the front plate 16 cross each other, and the sealing clip 3 can easily break in the portion.

The intermediate plate 18 of the sealing clip 3 is formed in a plate shape orthogonal to the contact plate 15, the front plate 16, and the rear plate 17, and is provided integrally with the contact plate 15, the upper region 16*b* of the front plate 16, and the rear plate 17. Therefore, the contact plate 15, the upper region 16*b* of the front plate 16, and the rear plate 17 can be reinforced by the intermediate plate 18.

In to the present embodiment, the easily breakable portion 33 of the intermediate plate 18 of the sealing clip 3 is formed thinner than the plate thickness of the other regions of the intermediate plate 18 (the regions other than the easily breakable portion 33). The present invention is not limited thereto as long as the easily breakable portion 33 breaks more easily than the other regions. For example, the easily breakable portion 33 may be formed by arranging a plurality of small holes in a broken line shape.

In the present embodiment, the intermediate plate 18 of the sealing clip 3 is provided with the easily breakable portion 33, and may be not provided with the easily breakable portion 33.

In the present embodiment, the movement of the sealing clip 3 in the width direction with respect to the hydraulic unit 1 and the like in the locked state is restricted by inserting the intermediate plate 18 of the sealing clip 3 between the connector basic surface 6*a* of the connector support 6 of the hydraulic unit 1 and the harness-side connector 2. However, the method for restricting the movement of the sealing clip 3 in the width direction is not limited thereto.

The sealing clip 3 and the hydraulic unit 1 and the like in the locked state may be provided with any movement restricting unit for restricting the movement of the sealing clip 3 in the width direction (a direction intersecting the upper-lower direction) with respect to the hydraulic unit 1 and the like in the locked state. For example, a protrusion or the like that contacts the front plate 16 or the rear plate 17 of the sealing clip 3 from the other side in the width direction may be provided on the side closer to the harness-side connector 2.

In this embodiment, the unit-side connector 7 is disposed between the second region 18*b* and the third region 18*c* of the intermediate plate 18 of the sealing clip 3, the front plate 16 of the sealing clip 3 contacts the rear surface 5*a* of the substrate case 5 of the hydraulic unit 1, the rear plate 17 of the sealing clip 3 contacts the rear surface 37 of the connector support 6 of the hydraulic unit 1 and the rear surface of the harness-side connector 2, and the second region 18*b* of the intermediate plate 18 of the sealing clip 3 is disposed between the reinforcing rib 8 of the hydraulic unit 1 and the outer peripheral wall 7*a* of the unit-side connector 7. This restricts the movement of the sealing clip 3 in the front-rear direction with respect to the hydraulic unit 1 and the like in the locked state. However, the method for restricting the movement of the sealing clip 3 in the front-rear direction is not limited thereto.

The sealing clip 3 and the hydraulic unit 1 and the like in the locked state may be provided with a movement restricting unit for restricting the movement of the sealing clip 3 in the front-rear direction (a direction intersecting the upper-lower direction) with respect to the hydraulic unit 1 and the like in the locked state. For example, the hydraulic unit 1 and the like in the locked state may be provided with a groove-shaped rail extending in the upper-lower direction in a state of being recessed in the width direction, and the sealing clip 3 may be provided with a protrusion capable of sliding on the rail. The movement of the sealing clip 3 in the front-rear direction with respect to the hydraulic unit 1 and the like in the locked state may be restricted by engagement between the rail and the protrusion.

In the present embodiment, the first claw (second engaging portion) 29 of the sealing clip 3 is formed in the intermediate plate 18, and is not limited thereto. For example, the first claw 29 may be formed in the upper region 16*b* of the front plate 16, or an arm extending upward from the contact plate 15 (an arm different from the intermediate plate 18 and the front plate 16) may be provided to form the first claw 29 in the arm.

In the present embodiment, the sealing clip 3 is provided with the intermediate plate 18, and may be not provided with the intermediate plate 18. The present embodiment is provided with the front plate 16, and may be not provided with the front plate 16. The present embodiment is provided with the rear plate 17, and may be not provided with the rear plate 17. That is, the sealing clip 3 may include at least a contact portion that contacts the slide lock 12 in the locked state from below (the contact plate 15 in the present embodiment) and a second engaging portion that is engaged with the first engaging portion (the reinforcing ribs 8 in the present embodiment) of the hydraulic unit 1 and the like in the locked state (the first claw 29 in the present embodiment).

In the present embodiment, the thin plate rib 19 having a substantially right triangular shape when viewed in the width direction is provided in the sealing clip 3. The shape of the thin plate rib 19 is not limited thereto. The thin plate rib 19 may be disposed at the corner 39 between the contact plate 15 and the lower region 16*a* of the front plate 16 and provided integrally with the contact plate 15 and the lower region 16*a* of the front plate 16.

In the present embodiment, the sealing clip 3 is provided with the thin plate rib 19, and may be not provided with the thin plate rib 19.

In the present embodiment, the hydraulic unit 1 is provided with a plurality of reinforcing ribs (first engaging portions) 8, but the number of the reinforcing ribs 8 is not limited thereto, and one reinforcing rib (first engaging portion) 8 may be provided.

In the present embodiment, the reinforcing ribs 8 of the hydraulic unit 1 function as the first engaging portion for locking the first claw (second engaging portion) 29 of the sealing clip 3. The first engaging portion is not limited thereto. For example, an engaging portion (first engaging portion) having only a function of engaging the first claw 29 of the sealing clip 3 may be provided to the hydraulic unit 1.

In the present embodiment, the first engaging portion is provided closer to the hydraulic unit 1 among the hydraulic unit 1 and the like in the locked state, but may be provided closer to the connector body 11 of the harness-side connector 2.

The present embodiment is provided with the slide lock (locking member) 12 supported by the connector body 11 of the harness-side connector 2 in a manner slidable in the upper-lower direction. The locking member is not limited thereto, and may have another configuration as long as the locking member is supported by the connector body 11 in a manner movable in the upper-lower direction (first direction) and can restrict the movement of the connector body 11 in the detachment direction with respect to the unit-side connector 7 at the locked position closer to the connector body 11.

For example, the locking member may be provided integrally with the lower surface of the connector body 11, extend in the width direction, and be elastically supported by the connector body 11 in a cantilever manner. Alternative, the locking member may have a tip end capable of tilting in the upper-lower direction (first direction) between the locked position closer to the connector body 11 and the unlocked position below the locked position. When brought into the connector connected state, the tip end may be engaged with an engaging portion provided closer to the unit-side connector 7 to come into the locked state.

In the present embodiment, the external connection connector connected to the unit-side connector 7 is the harness-side connector 2 provided at one end of the harness 10. The external connection connector is not limited thereto, and may be, for example, an external connection connector fixed to a predetermined apparatus.

In the present embodiment, the harness-side connector (external connection connector) 2 is connected to the unit-side connector 7 of the hydraulic unit (electronic control unit) 1 for controlling the brake hydraulic pressure of the vehicle, and is not limited thereto. The external connection connector may be connected to the unit-side connector 7 of another electronic control unit.

Although the present disclosure has been described based on the above-described embodiment, the present disclosure is not limited to the content of the above-described embodiment, and can be appropriately modified without departing from the present disclosure. That is, it is needless to say that all other embodiments, examples, operation techniques, and the like made by those skilled in the art based on the embodiments are included in the scope of the present disclosure.

The present application is based on the Japanese patent application filed on Mar. 2, 2021 (Japanese Patent Application No. 2021-032970), and the contents thereof are incorporated herein by reference.

INDUSTRIAL APPLICABILITY

The connector removal-restricting structure according to the present disclosure can be widely applied to structures for restricting the detachment of an external connection connector connected to an electronic control unit.

REFERENCE SIGNS LIST

1: hydraulic unit (electronic control unit)
2: harness-side connector (external connection connector)
3: sealing clip (sealing member)
7: unit-side connector
8: reinforcing rib (first engaging portion)
11: connector body (external connector body)
12: slide lock (locking member)
15: contact plate (contact portion)
16: front plate (extended portion)
**16*a***: lower region of front plate (one-side region)
**16*b***: upper region of front plate (other-side region)
18: intermediate plate (plate)
19: thin plate rib (rib)
29: first claw (second engaging portion)
33: easily breakable portion

The invention claimed is:

1. A connector removal-restricting structure comprising:
an electronic control unit including a unit-side connector;
an external connection connector including
an external connector body connected to the unit-side connector and
a locking member supported by the external connector body in a manner movable between a locked position closer to the external connector body and an unlocked position on one side in a first direction with respect to the locked position,
wherein the locking member is configured that a movement in a detachment direction of the external connector body in a connector connected state, in which the external connector body is connected to the unit-side connector, is restricted in a locked state in which the locking member is located at the locked position, and a movement in the detachment direction of the external connector body in the connector connected state is allowed in an unlocked state in which the locking member is located at the unlocked position; and
a sealing member configured to be attached to the external connection connector and the electronic control unit in the locked state by sliding from the one side to the other side in the first direction while being restricted from moving in a direction intersecting the first direction, and to, at a sealed position on the other side, restrict movement of the locking member with respect to the external connector body from the locked position toward the unlocked position,
wherein at least one of the electronic control unit or the external connector body includes a first engaging portion, and
wherein the sealing member includes:
a contact portion configured to, at the sealed position, contact the locking member in the locked position from the one side in the first direction; and
a second engaging portion configured to, at the sealed position, be engaged with the first engaging portion to restrict movement of the sealing member toward the one side in the first direction with respect to the electronic control unit and the external connection connector in the locked state.

2. The connector removal-restricting structure according to claim 1,
wherein the sealing member includes:
an extended portion extending from one end of the contact portion in a second direction intersecting the first direction toward both sides in the first direction; and
a rib disposed at a corner between the contact portion and a one-side region of the extended portion on the one side in the first direction with respect to the one end of the contact portion, the rib being provided integrally with both the contact portion and the one-side region of the extended portion;
wherein the second engaging portion of the sealing member is provided integrally with an other-side region of the extended portion on the other side in the first direction with respect to the one end of the contact portion,
wherein the rib of the sealing member is formed in a plate shape intersecting both the first direction and the second direction, and
wherein the rib of the sealing member breaks when a load toward the one side in the first direction is input to the contact portion and the contact portion is tilted about the one end in a direction approaching the one-side region of the extended portion.

3. The connector removal-restricting structure according to claim 2,
wherein the sealing member includes a plate formed in a plate shape intersecting both the first direction and the second direction, the plate being disposed on the other side in the first direction of the contact portion, and being provided integrally with both the contact portion and the other-side region of the extended portion, and
wherein the plate of the sealing member includes an easily breakable portion extending from an end of the plate on the other side in the first direction toward a corner between the contact portion and the other-side region of the extended portion.

* * * * *